US 12,254,465 B2

United States Patent
Ahmad (10) Patent No.: US 12,254,465 B2
(45) Date of Patent: Mar. 18, 2025

(54) SELF-CUSTODY WALLET COMBINATION PAYMENT CARD FOR PAYMENT CARD NETWORK AND BLOCKCHAIN TRANSACTIONS

(71) Applicant: MASTERCARD INTERNATIONAL INCORPORATED, Purchase, NY (US)

(72) Inventor: Mohammed Sadiq Ahmad, Dublin, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 142 days.

(21) Appl. No.: 17/889,724

(22) Filed: Aug. 17, 2022

(65) Prior Publication Data

US 2023/0069875 A1 Mar. 9, 2023

Related U.S. Application Data

(60) Provisional application No. 63/234,481, filed on Aug. 18, 2021.

(51) Int. Cl.
*G06Q 20/36* (2012.01)
*G06Q 20/38* (2012.01)

(52) U.S. Cl.
CPC ..... *G06Q 20/3674* (2013.01); *G06Q 20/3825* (2013.01); *G06Q 2220/00* (2013.01)

(58) Field of Classification Search
CPC .............................................. G06Q 20/00–425
See application file for complete search history.

(56) References Cited

U.S. PATENT DOCUMENTS

| 2015/0170112 | A1 | 6/2015 | DeCastro |
| 2015/0356555 | A1 | 12/2015 | Pennanen |
| 2019/0080300 | A1 | 3/2019 | Stojanovski |
| 2019/0370446 | A1* | 12/2019 | Davis ................. G06Q 20/3674 |

FOREIGN PATENT DOCUMENTS

| JP | 2020533716 A | 11/2020 |
| JP | 2021051585 A | 4/2021 |

(Continued)

OTHER PUBLICATIONS

Machine Translation of KR20200030884A, Device for Transacting Cryptocurrency and Method Thereof, Mar. 23, 2020, Korea (Year: 2020).*

(Continued)

*Primary Examiner* — Mohammad A. Nilforoush
(74) *Attorney, Agent, or Firm* — Talem IP Law, LLP (57) ABSTRACT

A self-custody wallet combination payment card includes an electronic component with storage, a processor, and a near field communications interface. Two programs are stored at the electronic component and, once provisioned, the electronic component stores one or more blockchain addresses and security keys. The two programs can include a payment application which can interface with point of sale terminals (e.g., following EMV specifications) and a crypto application which has the capability to securely store keys and return a signature for blockchain transaction.

15 Claims, 5 Drawing Sheets

(56) References Cited

FOREIGN PATENT DOCUMENTS

| KR | 20200030884 A | * | 3/2020 | ......... G06F 3/03547 |
| WO | 2020251597 A1 | | 12/2020 | |

OTHER PUBLICATIONS

D'CENT, Easy to use with "Tap to Verify" Transaction Card Wallet, Online, Aug. 14, 2021, Retrieved on Nov. 22, 2022, Retrieved from: https://web.archive.org/web/20221024022033/https://dcentwallet.com/products/CardWallet, 7 pages.

D'CENT Wallet, "D'CENT Card: Guide #01—Card setup (ENG)", YouTube, May 31, 2019, Retrieved on Nov. 22, 2022, Retrieved from: https://www.youtube.com/watch?v=XbVdPgtfvjk, 16 pages.

Guilluame, Dion, "Bitcoin Wallets for Beginners, Part One: Self Custody," Bitcoin Magazine, Mar. 15, 2021, Retrieved on Nov. 22, 2022, Retrieved from: https://bitcoinmagazine.com/guides/bitcoin-wallets-for-beginners-part-one-self-custody-and-avoiding-kyc, 11 pages.

International Search Report and Written Opinion issued in International Application No. PCT/US2022/040573, mailed Dec. 8, 2022, 11 pages.

Notice of Allowance issued in Japanese Application No. 2024-509493, mailed Jan. 7, 2025, 4 pages.

\* cited by examiner

SELF-CUSTODY WALLET COMBINATION PAYMENT CARD FOR PAYMENT CARD NETWORK AND BLOCKCHAIN TRANSACTIONS

BACKGROUND

As digital currencies, such as cryptocurrency, gain wider acceptance by the public, it becomes also important to support payment transactions at merchants that are currently set up only for payments over conventional payment card and banking networks. In addition, since most financial services are regulated with guidelines that include standards such as Know Your Customer (KYC), which involves verifying customer identity, suitability, and risks regarding fraud, corruption, money laundering, and the like, providing a pathway to KYC for cryptocurrency wallets may become important.

BRIEF SUMMARY

Self-custody wallet combination payment cards for payment card network and blockchain transactions are provided. Digital assets can be used in payment transactions over conventional payment card networks using the described self-custody wallet combination payment cards.

A self-custody wallet combination payment card includes an electronic component with storage, a processor, and a near field communications interface. Two programs are stored at the electronic component and, once provisioned, the electronic component stores one or more blockchain addresses and security keys. The two programs include a payment application which can interface with point of sale terminals (e.g., following EMV specifications) and a crypto application which has the capability to securely store keys and return a signature for a blockchain transaction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2A-2C illustrate process flow diagrams for operations carried out with a self-custody wallet combination payment card.

DETAILED DESCRIPTION

Self-custody wallet combination payment cards for payment card network and blockchain transactions are provided. Digital assets can be used in payment transactions over conventional payment card networks using the described self-custody wallet combination payment cards.

The self-custody wallet combination payment card provides a chip card that can function as both a crypto card and a hardware wallet.

A chip card is a payment card that includes an electronic component with secure storage and secure processing. Secure storage is used to store sensitive information such as cryptographic keys and security data. A storage may be considered secure storage where the memory locations are intended to be protected from unwanted access. Secure storage is usually a non-volatile memory that can include protection mechanisms. Encrypted binary large object (blob) of keys, anti-tamper protection, and a private key bus are some common protection mechanisms used to provide the secure storage. Secure processing includes cryptographic processing, which includes the generation, verification, and certification of cryptographic keys (e.g., public and private keys). A designated hardware processor or processing elements (with or without hardware accelerators) may be used for the secure processing. Most chip cards conform to the EMVCo standards.

A crypto card is a payment card that is associated with a crypto wallet, where the funds associated with the payment card are managed through a crypto wallet.

A crypto wallet refers to an application that allows for secure storage and management of digital assets such as crypto currencies. Crypto wallets may be offered by Crypto Wallet Providers and can usually hold multiple cryptocurrencies. Crypto wallets can be implemented in various forms including a hot wallet and a cold wallet.

A hot wallet refers to a crypto wallet that is connected to the internet, for example, in the form of a mobile wallet on a phone. Because the information of the hot wallet is stored online, there is a risk of being hacked.

A cold wallet refers to a crypto wallet that is not connected to the internet, for example, a paper/physical wallet (e.g., where one writes down the information) or a hardware wallet. Information stored at a cold wallet is safe from online hacking, but can be lost or stolen if proper care is not taken.

A hardware wallet refers to a wallet where the security keys are stored in the hardware. Popular hardware wallets can be in the form of a dongle. A hardware wallet is suitable for a self-custodied/self-custody wallet.

A self-custodied/self-custody wallet is a wallet where the keys are owned and managed by a user/owner. Self-custodied wallets may be hot (e.g., online) or cold (e.g., hardware).

A custodied wallet is a wallet where the keys are managed by a wallet provider, not by the user/owner.

Figure 1A:
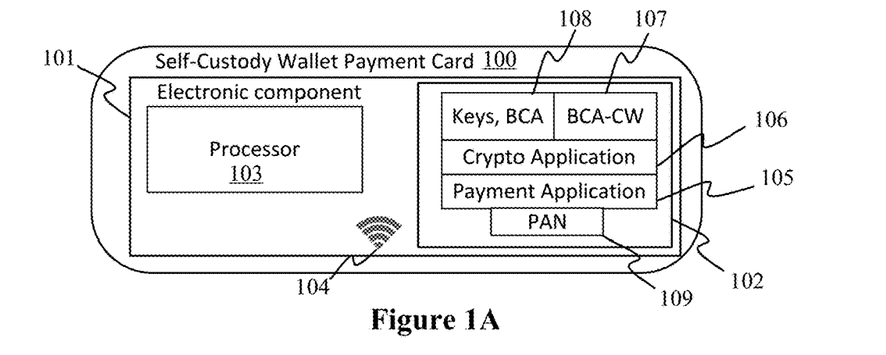
FIG. 1A shows a representative diagram of a self-custody wallet combination payment card.

FIG. 1A shows a representative diagram of a self-custody wallet combination payment card. Referring to FIG. 1A, a self-custody wallet combination payment card 100 is provided that includes an electronic component 101 with storage 102, a processor 103, and a near field communications interface 104. The electronic component 101 of the self-custody wallet combination payment card 100 may be embodied as described with respect to computing device 300 of FIG. 3. The storage 102 can be or include secure storage. The processor 103 can be or include a secure processing component (e.g., processing element(s) that include protection mechanisms and/or include cryptographic accelerator(s)). Two programs are stored at the electronic component; and, once provisioned, the electronic component stores one or more blockchain addresses and security keys at storage 102.

The two programs include a payment application 105 such as a conventional payment application (e.g., following the EMV standards) and a crypto application 106, which has the capability to securely store keys (e.g., keys 108) and return signature for blockchain transactions. The self-custody wallet combination payment card further stores at least one blockchain address for a crypto card wallet account (e.g., blockchain address 107). This blockchain address is a different address than for the digital asset managed by the crypto application (which provides the self-custodied wallet on the payment card). The custody of the keys controlling this blockchain address for the crypto card wallet account (and not the address managed by the crypto application providing the self-custodied wallet) is with the crypto wallet provider.

The self-custody wallet combination payment card can be provisioned with a primary account number (PAN) 109. The PAN 109 can be associated with a custodied wallet, such as implemented by a crypto card, which is described in more detail with respect to FIGS. 1B and 2A.

The described self-custody wallet combination payment card can provide a cost-effective hardware wallet to securely store and easily access the security keys (e.g., keys 108) that enable the holder to verify cryptocurrency transactions and prove ownership/access of the cryptocurrency. This hardware wallet feature enables self-custody use-cases.

Figure 1B:
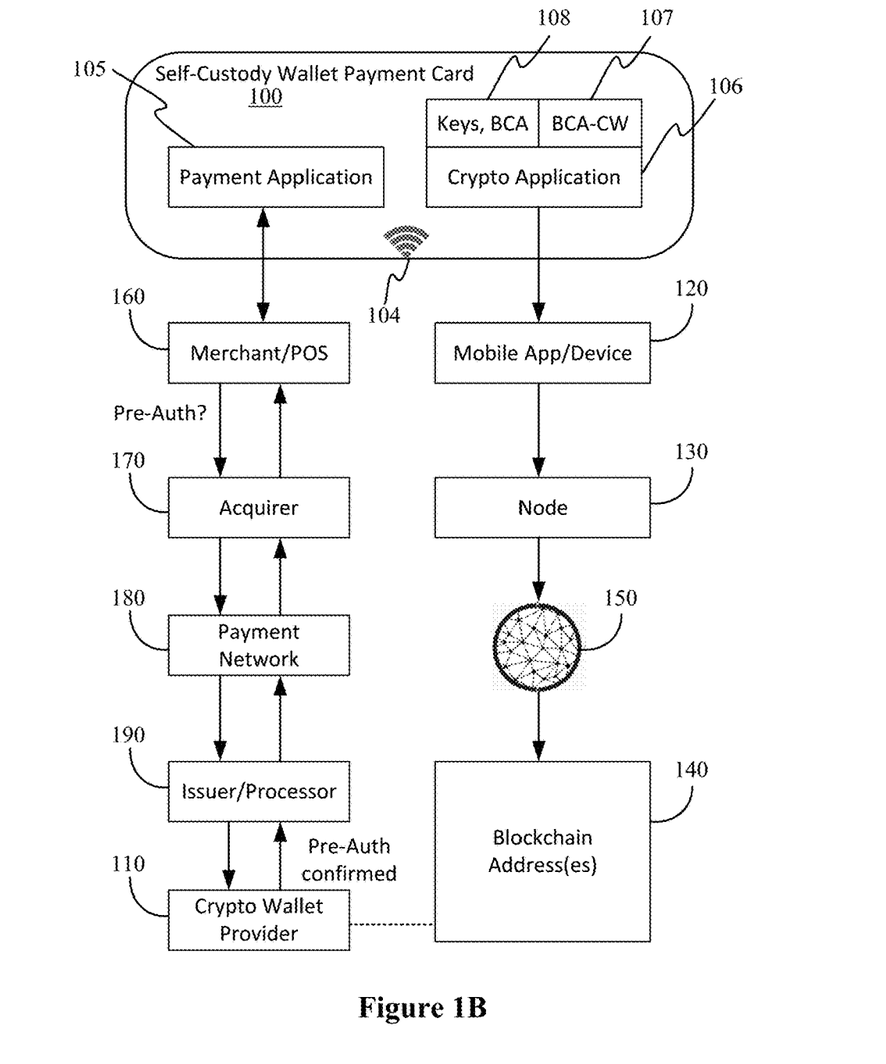
FIG. 1B illustrates an example operating environment for a self-custody wallet combination payment card for payment card network and blockchain transactions.

FIG. 1B illustrates an example operating environment for a self-custody wallet combination payment card for payment card network and blockchain transactions. Referring to FIG. 1B, as described with respect to FIG. 1A, the self-custody wallet combination payment card 100 includes two programs (e.g., payment application 105 and crypto application 106) stored at the electronic component. During initialization/setup of the card 100, the crypto application 106 is configured with the blockchain address(es) of the custodied wallet account (e.g., stored as BCA-CW 107), which is custodied by the crypto wallet provider 110. The crypto wallet provider 110 provides the custodied wallet by controlling/managing the security keys for the account. As mentioned above, this blockchain address (BCA-CW 107) is a different address than for the digital asset managed by the crypto application 106 (and which is for the self-custodied wallet on the payment card). The blockchain address BCA-CW 107 can be used as the receiving address on the blockchain for custodied wallet top-up scenarios (e.g., to transfer from the self-custodied wallet to the custodied wallet).

The crypto application 106 can be managed by a mobile application ("Mobile App") 120, which also supports self-custody use-cases. Mobile app 120 can be a stand-alone application or integrated as part of an issuer (e.g., bank) application or a wallet application (e.g., of a crypto wallet provider) as some examples. Mobile app 120 is stored in memory and executed by a processor of a computing device as described in more detail with respect to FIG. 4.

Figure 2A:
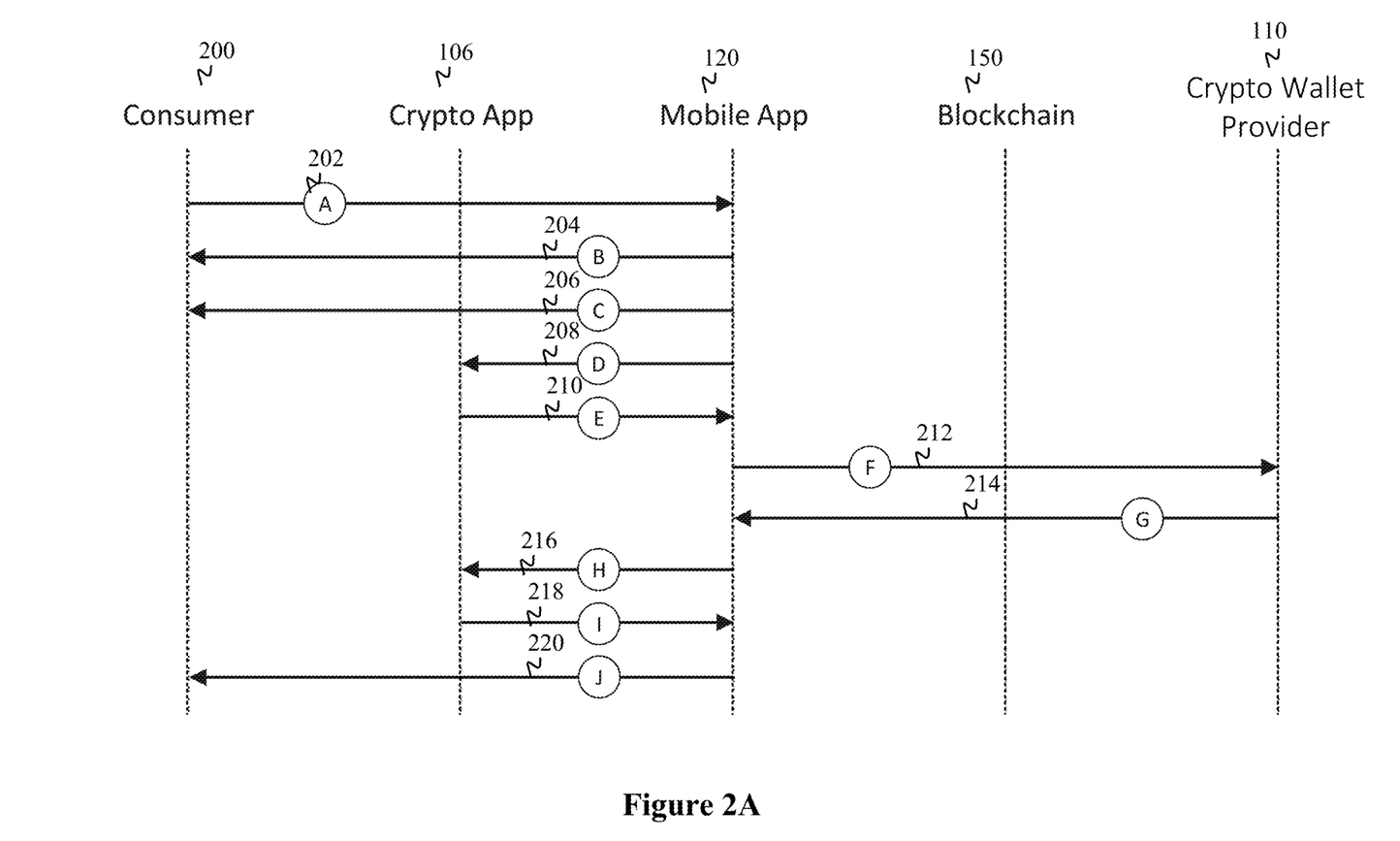
FIG. 2A shows a process flow for initializing the crypto application.

The self-custody wallet configuration can be done by the user upon receiving the card. The card supports creation of a wallet with new keys and a configuration where a wallet can be created by injecting existing keys. During the self-custodied wallet creation process, the self-custody account is associated with the consumer owning the crypto card account. The mapping can occur by binding the blockchain address for the custody wallet asset (e.g., BCA-CW 107) with the blockchain address for the self-custody wallet asset (which then can be received by a mapping entity as part of the activation request). This association can be stored by the mapping entity, which may be an issuer (e.g., bank), wallet provider, or self-custody platform/application provider, as examples. If the mapping entity is the issuer, processor, or custodied wallet provider which has access to the PAN for the card, the mapping can, in some cases, include <PAN, blockchain address for the custody wallet asset, the blockchain address of for the self-custody wallet asset>. An example initialization process is shown in FIG. 2A.

For example, the crypto application 106 can create a self-custodied wallet by establishing a private key associated with a self-custody blockchain address in response to receiving a request from the mobile app to create a wallet. As described with respect to the example initialization process of FIG. 2A, the request to create a wallet can include authentication information (e.g., PIN or biometric). The crypto application 106 can validate the authentication information, create the wallet (e.g., generate keys and a self-custody blockchain address), and provide activation request information (e.g., the blockchain address) back to the mobile app. The wallet can be initially created in an inactive state (e.g., keys available but inactive) until the crypto application 106 receives a request from the mobile app to activate the wallet. In certain operations, the crypto application 106 can check to confirm that the private key is in an active state before using the private key for signing a transaction request. The request to activate the wallet can include an activation certificate that may be generated by a custody wallet provider. The mobile app can map the blockchain address of the self-custodied wallet and the blockchain address of a custody wallet of the user.

Figure 2B:
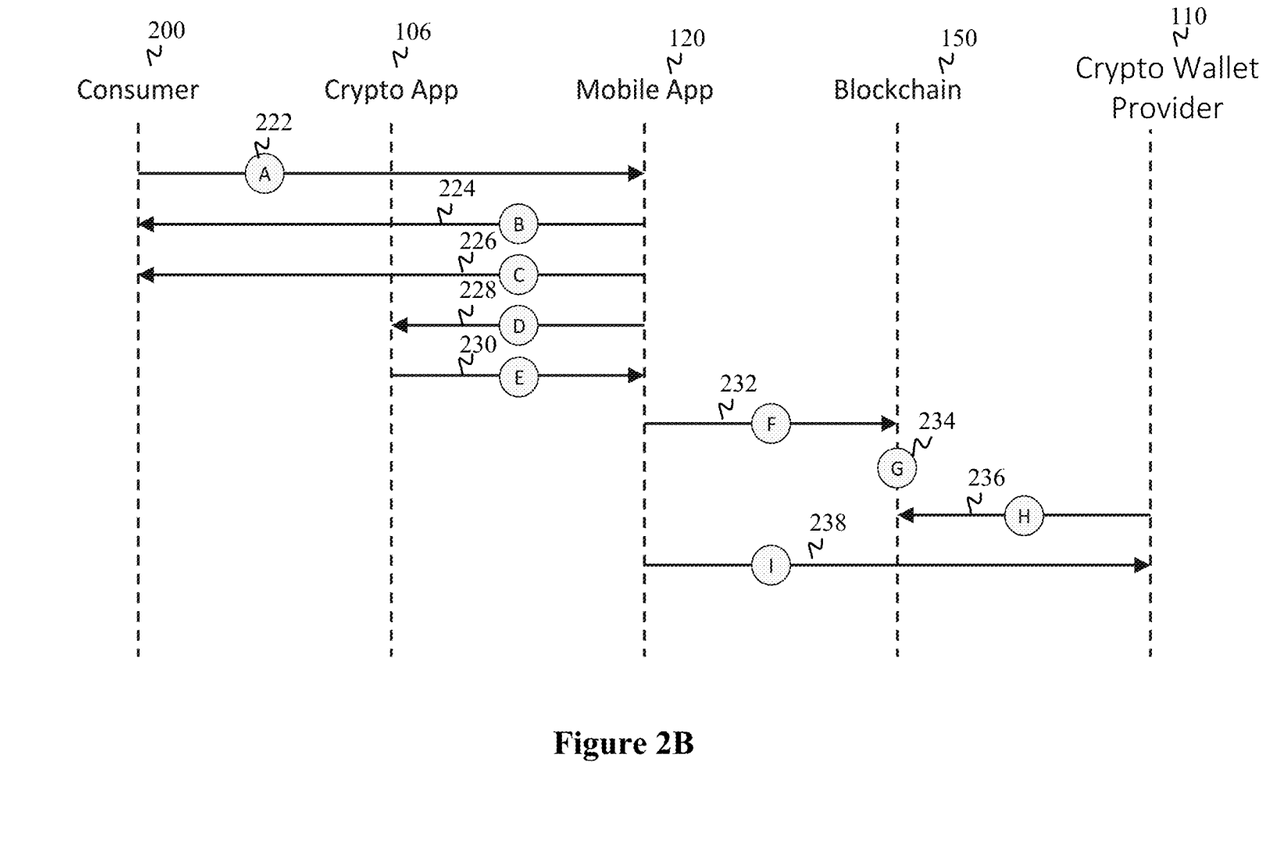
FIG. 2B shows a process flow for topping-up the custody wallet.

A use case for the card 100 can include topping-up the crypto card (e.g., topping-up the custody wallet associated with the crypto card with funds from self-custodied wallet), In a topping-up scenario, a consumer can initiate a top-up use case and specify the amount to apply in the mobile app 120. The crypto application 106 can be used to add an amount of cryptocurrency value to a custody wallet associated with a blockchain address stored on the card 100 through communication with the mobile application over the near-field communication channel. For example, the mobile app 120 requests the consumer to authenticate themselves (e.g., via PIN or biometric) and requests the consumer tap the card 100 to the mobile device 120 (setting up a near-field communication channel over the card interface 104 such that the near-field communication channel is established between the card 100 and the computing device running the mobile app 120). The consumer can perform the requested operations, including tapping the card 100 on the mobile device 120. The crypto application 106 signs and returns the transaction signature to the mobile app 120. For example, performing computations and generating a signed transaction request using the keys and blockchain address(es) of the self-custodied wallet account (e.g., keys, blockchain address(es) 108) and the blockchain address(es) of the custodied wallet account (blockchain address 107). The mobile app 120 initiates the blockchain transaction through some node 130 or setup over the blockchain network 150 to the appropriate address location(s) 140. An example top-up process is shown in FIG. 2B.

For a payment at a merchant (e.g., for payment based on digital currency/cryptocurrency), the card 100 can be used at a payment terminal (merchant point of sale terminal (POS) 160) in a conventional manner, for example, where, in response to a payment request by the payment application 105 (e.g., including PAN 109 of FIG. 1A) at the POS 160, the POS 160 communicates an authorization request to an acquirer 170 through a payment network 180 to an issuer/processor 190. Since the PAN (e.g., PAN 109 of FIG. 1A) is associated with a crypto wallet provider, the issuer/processor 190 identifies the PAN in the authorization request as part of a crypto wallet provider 110 and can communicate with the crypto wallet provider 110. The crypto wallet provider 110 can respond to the authorization request; and the authorization response is based on funds available in the wallet account.

The described self-custody wallet combination payment card can provide a crypto card 'associated' with the self-custodied wallet. An entity (e.g., an issuer (e.g., bank), wallet provider, or self-custody platform/application provider, as examples) can provide a relationship mapping of a crypto card wallet account (with associated KYC information) and a self-custodied wallet at the self-custody wallet combination payment card. By associating the ownership of a self-custodied wallet to the consumer owning the crypto card, a pathway is provided to KYC for self-custodied wallets. Even though the self-custodied application (crypto application 106) and the custodied application (with crypto wallet provider 110/payment application 105) are disjoint, their ownership can be linked. When the self-custodied application is configured (either with a new wallet creation, or injecting the keys of an existing wallet), the crypto application 106 notifies the blockchain address of the self-custodied wallet (e.g., stored as part of 108) to an appropriate entity (e.g., issuer, wallet provider, etc.). In some cases, the crypto application 106 can be configured in such a way that it cannot access the self-custody keys (e.g., 108) unless the crypto application 106 notifies the blockchain address (of the self-custodied wallet) corresponding to these keys to an appropriate entity (for example: the crypto wallet provider, the card issuer, or the self-custody application provider) and obtains an activation certificate from the entity. In addition, by incorporating a conventional payment application 105 and a PAN 109 associated with a crypto card/custodied wallet, the card is both able to provide self-custody features (consumer owns the keys) and custody features (consumer can use card to pay at retail merchants). Thus, it is possible to achieve KYC for a blockchain account/address and still hold the keys.

Advantageously, the described self-custody wallet combination payment card does not require the multi-step process that consumers with self-custodied funds must go through in order to spend their self-custodied funds at retail merchants, which includes creating a custodied wallet account with a wallet provider who offers crypto cards, moving funds to the custodied wallet account, and using the crypto card to pay at merchants. Rather, a consumer can use the self-custody wallet combination payment card that contains both the hardware wallet for the self-custodied wallet and a conventional payment application with PAN associated with a custodied wallet to pay with digital assets. A simple top-off process (e.g., as described with respect to FIG. 2B) can be carried out to transfer digital assets from the self-custodied wallet to the custodied wallet as needed.

Figure 2C:
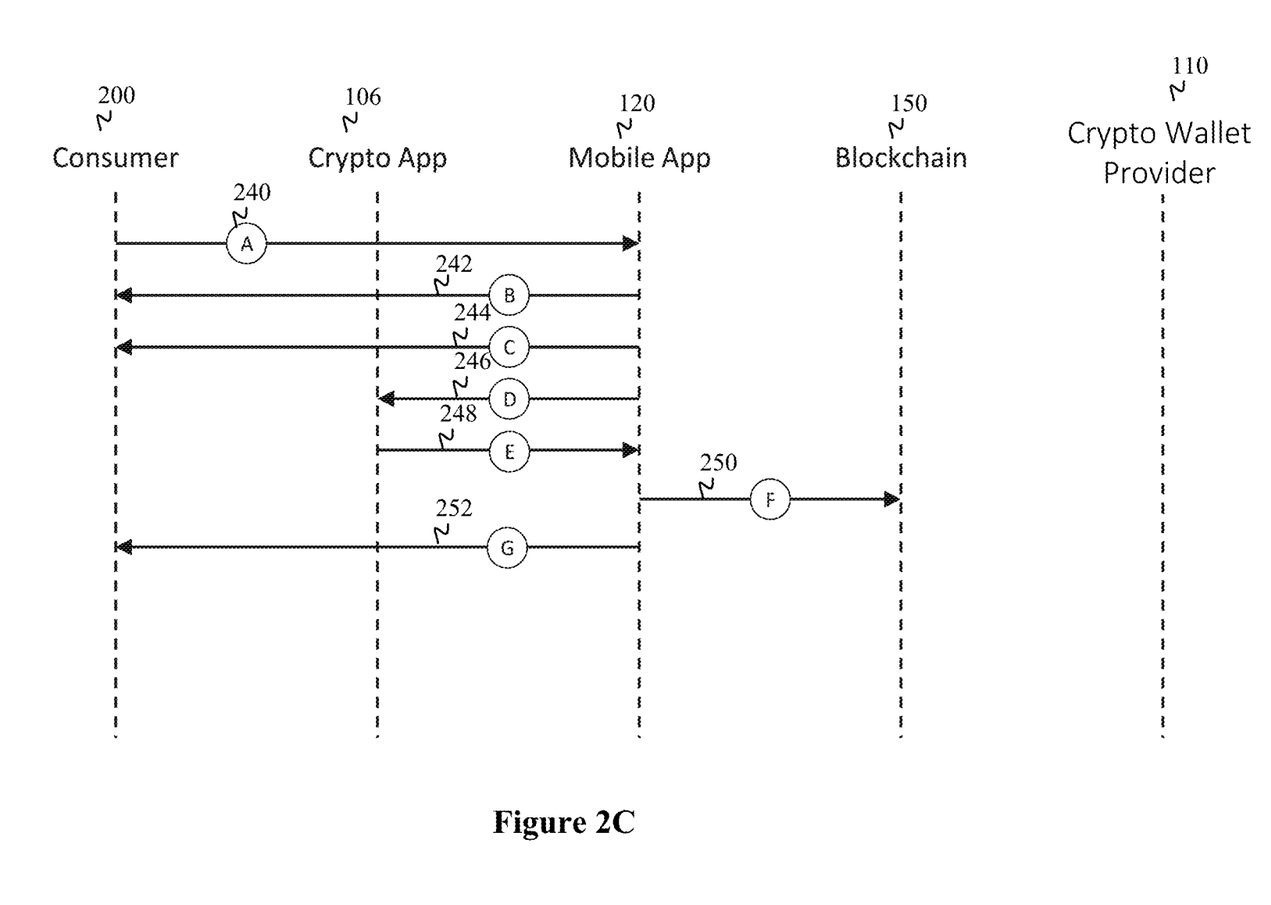
FIG. 2C shows a process flow for a self-custody use-case.

FIGS. 2A-2C illustrate process flow diagrams for operations carried out with a self-custody wallet combination payment card. FIG. 2A shows a process flow for initializing the crypto application; FIG. 2B shows a process flow for topping-up the custody wallet; and FIG. 2C shows a process flow for a self-custody use-case.

Referring to FIG. 2A, Consumer 200 can initiate (202) the configuration of crypto app 106 by selecting an appropriate option on the Mobile App 120. In some cases, Mobile App 120 may request (204) more information from the consumer 200 regarding the network (Ethereum, Blockchain, etc.) and new/existing wallet; if there is an existing wallet, the mobile app 120 can capture the mnemonic words. In operation 206, Mobile App 120 asks the Consumer 200 to enter the Crypto app PIN and tap the card; and the Consumer 200 would continue the process by entering the PIN and tapping the card.

In operation 208, Mobile App 120 submits the PIN to the Crypto app 106 and requests that the crypto app 106 create a wallet. For example, the mobile app 120 can send a request to "create new wallet for Ethereum network," or "create Bitcoin wallet for existing keys."

In operation 210, Crypto App 106 validates the PIN, creates a wallet/keys (prk.sc=private key of self-custody, bca.sc=blockchain address of self-custody) in inactive state, and provides 'activation request' information to the Mobile app 120.

In operation 212, Mobile App 120 provides activation request to the Crypto Wallet Provider 110 managing the custody wallet and requests for an 'activation cert.'

In operation 214, Crypto Wallet Provider 110 validates the requests and provides the certificate. In some cases, the certificate is the signature of bca.sc using prk.c (private key of custody wallet which the custody wallet provider has). At this point, bca.c (bca.c=blockchain address of custody wallet) and bca.sc are mapped.

In operation 216, Mobile App 120 requests the Crypto App 106 to activate the wallet by providing the 'activation cert'. In operation 218, Crypto App 106 validates the 'activation cert' and responds with the result. Validation can be done using the public key derived from bca.c, which the Crypto App 106 has. The Mobile App 120 can then notify the Consumer of the activation in operation 220.

The following table illustrates certain parameters for steps A (202), E (210), and H (216).

|  | Step-A | Step-E | Step-H |
|---|---|---|---|
| Crypto App PIN | PIN = available, active | No change | No change |
| Wallet/Keys (Self-Custody) | prk.sc = not available | prk.sc = available, inactive | prk.sc = available, active |
| Wallet/Keys (Self-Custody) | bca.c = available | No change | No change |

Referring to FIG. 2B, Consumer 200 can initiate (222) top-up of the custody wallet managed by Crypt Wallet Provider 110 by selecting an appropriate option on the Mobile App 120. In some cases, Mobile App 120 may request (224) more information regarding the digital asset to top-up etc. In operation 226, Mobile App 120 asks the Consumer 200 to enter the Crypto app PIN and tap the card; and the Consumer 200 would continue the process by entering the PIN and tapping the card.

In operation 228, Mobile App 120 submits the PIN to the Crypto app 106 and requests the crypto app 106 to provide a transaction signature which can be submitted to the blockchain 150.

In operation 230, Crypto App 106 validates the PIN, formats the transaction, signs the transaction using prk.sc, and provides the transaction signature to the Mobile App 120. The transaction signature can include the custodied blockchain address (bca.c) as the receiving/recipient address. Before using the private key to sign the transaction, Crypto App 106 ensures that the private key is in activated state.

In operation 232, Mobile App 120 sends the transaction to the blockchain network 150. An option for this operation is to go through a node 130 as described with respect to FIG. 1B.

In operation 234, the Blockchain 150 incorporates/executes the transaction.

In operation 236, as a result of the transaction, the Custody Wallet Provider 110 can identify the transaction (beneficiary=bca.c), and updates the balance associated with bca.c.

In operation 238, Mobile App 120 fetches the balance from the Custody Wallet Provider 110 and updates its interface so that the consumer 200 can view the balance of both the self-custodied wallet and the custodied wallet via the mobile app 120.

Referring to FIG. 2C, Consumer 200 can initiate (240) self-custody use-cases by selecting an appropriate self-custody use-case (for example, P2P) on the Mobile App 120. In some cases, Mobile App may request (242) more information regarding the digital asset, blockchain address etc. In operation 244, Mobile App 120 asks the Consumer 200 to enter the Crypto app PIN and tap the card; and the Consumer 200 would continue the process by entering the PIN and tapping the card.

In operation 246, Mobile App 120 submits the PIN to the Crypto app 106 and requests the crypto app 106 to provide a transaction signature which can be submitted to the blockchain 150. In operation 248, Crypto App 106 validates the PIN, formats the transaction, signs the transaction using prk.sc, and provides the transaction signature to the Mobile App 120. Before using the private key to sign the transaction, Crypto App 106 ensures that the private key is in activated state. In operation 250, Mobile App 120 sends the transaction to the blockchain network 150 (e.g., via a node 130). In operation 252, Mobile App 120 can notify the Consumer 200 of the transaction.

Figure 3:
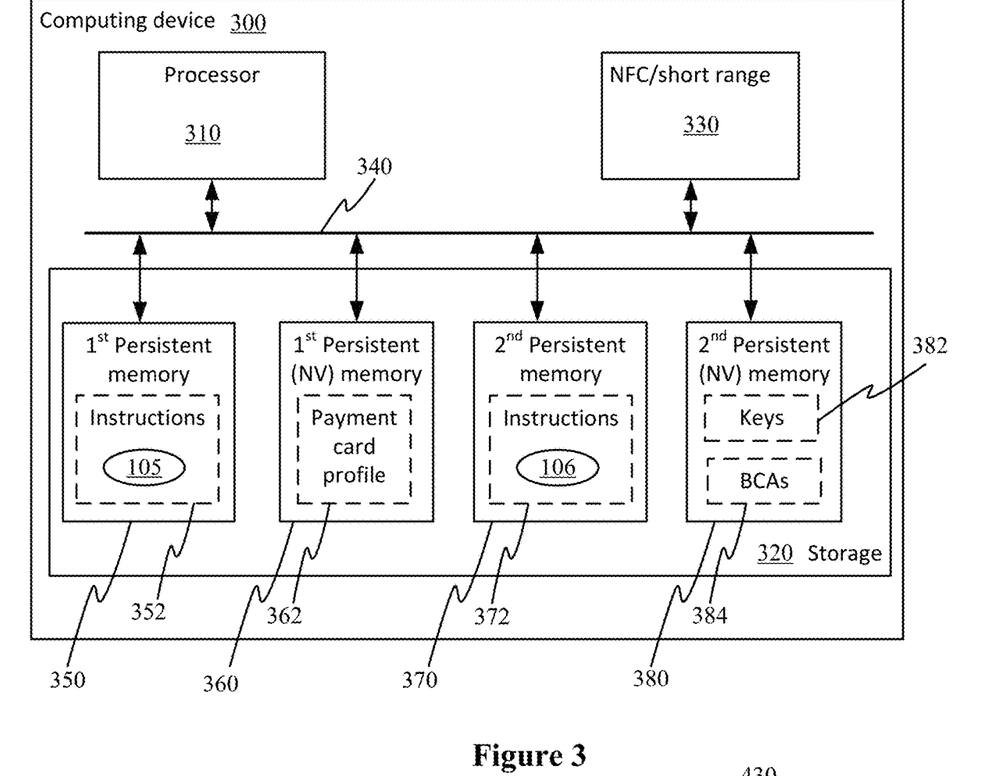
FIG. 3 illustrates a schematic of an example self-custody wallet combination payment card.

FIG. 3 illustrates a schematic of an example self-custody wallet combination payment card. Referring to FIG. 3, computing device 300 can include a processor 310, storage 320, and a short range communications interface 330 (near field, wide band, or other common short range communication protocols) coupled, for example, via a system bus 340.

Processor 310 can include one or more of any suitable processing devices ("processors"), such as a microprocessor, central processing unit (CPU), graphics processing unit (GPU), field programmable gate arrays (FPGAs), application-specific integrated circuits (ASICs), logic circuits, and state machines.

Storage 320 can include a first persistent (e.g., non-volatile) memory 350 storing instructions 352 for a payment application (e.g., payment application 105), a first non-volatile memory 360 storing payment credentials (e.g., including PAN) for a payment card profile 362, a second persistent (e.g., non-volatile) memory 370 storing instructions 372 for a crypto application (e.g., crypto application 106), and a second non-volatile memory 380 storing keys 382 and blockchain addresses 384.

Figure 4:
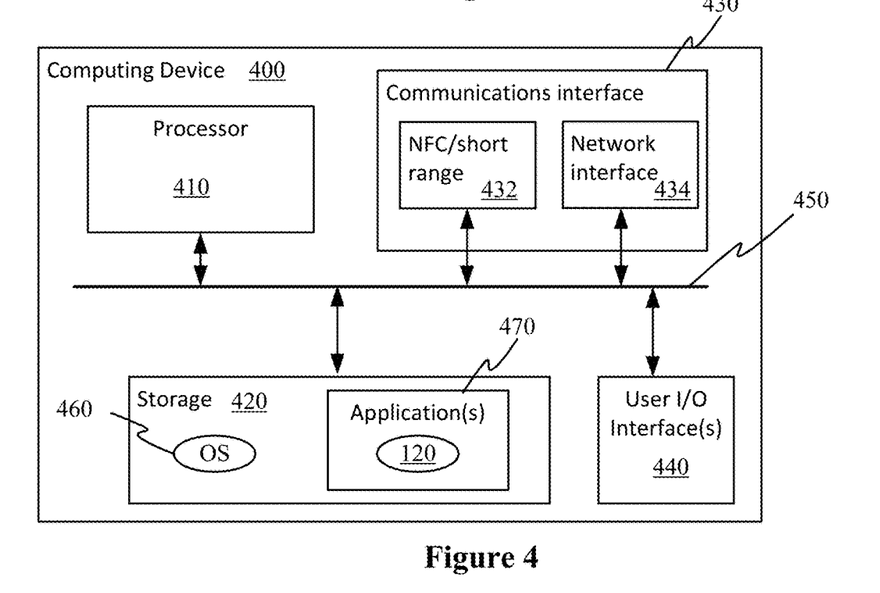
FIG. 4 illustrates a schematic of an example computing device through which to support a self-custody wallet combination payment card.

The short range communications interface 330 (near field, wide band, or other common communication protocols) can be used to communicate with a contactless reader and a mobile device (e.g., computing device 400 of FIG. 4). Example protocols for the short range communications interface 330 include BLUETOOTH and Zigbee.

In some cases, the instructions 352 for the payment application and the instructions 372 for the crypto application can be implemented as part of a smart card computing environment, such as the Java Card Platform, on which applets (for the two applications) are run (e.g., executed by processor 310). In such a case, the first persistent memory 350 and second persistent memory 370 is part of the secure memory of a computing device/card. In addition, at least the keys 382 would be stored as part of the secure memory of the computing device/card. It should be understood that although four separate memories are described, these may be implemented as part of one or more of the same memory devices at separate regions/memory locations.

FIG. 4 illustrates a schematic of an example computing device through which to support a self-custody wallet combination payment card. Referring to FIG. 4, computing device 400 can include a processor 410; storage 420; a communications interface 430 including a short range communications interface 432 (near field, wide band, or other common short range communication protocols) and a network interface 434; and a user input/output (I/O) interface 440 coupled, for example, via a system bus 450.

Computing device 400 may represent a computing device such as, but not limited to, a personal computer, a reader, a mobile device, a personal digital assistant, a wearable computer, a smart phone, a tablet, a laptop computer (notebook or netbook), and a desktop computer. Accordingly, more or fewer elements described with respect to computing device 400 may be incorporated to implement a particular computing device.

Processor 410 can include one or more processing elements. Examples of processing elements include, but are not limited to, a central processing unit (CPU), a graphics processing unit (GPU), field programmable gate arrays (FPGAs), a microprocessor, application-specific integrated circuits (ASICs), logic circuits, and state machines.

Storage 420 may include volatile and nonvolatile memories, removable and non-removable media implemented in any method or technology for storage of information, such as computer readable instructions, data structures, program modules, or other data. Examples of storage 420 include random access memory, read only memory, magnetic disks, optical disks, CDs, DVDs, flash memory, magnetic disk storage or other magnetic storage devices, or any other suitable storage media. In no case is the storage medium (or any storage media described herein) a transitory propagated signal.

Processor 410 can transform or manipulate data according to the instructions of software, including the operating system (OS) 460 and any applications 470 stored at storage 420. The OS 460 controls and coordinates the functions of the various components in the computing device 400, including enabling applications 470 to connect with lower level interfaces like the networking interface. Application(s) 470 includes mobile app 120, which may be a stand-alone application or integrated into another application at the computing device 400.

Communications interface 430 may include communications connections and devices that allow for communication with other computing systems over one or more communication networks (not shown). Short range communications interface 432 can include an interface for near field, wide band, and/or other wireless communication protocols providing wireless connectivity within a local sphere of interaction. Example protocols for the short range communications interface 330 include BLUETOOTH and Zigbee. Network interface 434 can include an interface for accessing local area networks and/or the Internet.

User (I/O) interface(s) 440 support input devices such as a mouse, track pad, keyboard, a touch device for receiving a touch gesture from a user, a motion input device for detecting non-touch gestures and other motions by a user, a microphone for detecting speech, and/or other types of input devices and their associated processing elements capable of receiving user input; and output devices such as display screen(s) (e.g., to display graphical user interfaces such as would be displayed for mobile app 120), speakers, haptic devices for tactile feedback, and/or other types of output devices.

As described in the use case scenarios herein, the computing device 400 executing the mobile app 120 provides an interface to communicate with the self-custody wallet combination payment card 100 to assist with initializing the card and topping off the card. The communication channel between the computing device 400 and the self-custody wallet combination payment card 100 is implemented by communications interface 430, for example, via near field/short range communications interface 432 that supports near-field/short-range wireless communications between the card 100 and the computing device 400.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A self-custody wallet combination payment card, comprising:
   a memory storing a payment application, a crypto application, a blockchain address for a crypto card wallet account, and security keys for a self-custodied wallet;
   a processor; and
   a near field communications interface for establishing a near-field communication channel;
   wherein the crypto application, when executed by the processor, performs:
      receiving, via the near-field communication channel and from a mobile application running on a mobile device, a request to create the self-custodied wallet, wherein the request to create the self-custodied wallet comprises authentication information;
      validating the authentication information;
      creating a private key in an inactive state;
      storing the private key in the memory as part of the security keys for the self-custodied wallet;
      generating a self-custody blockchain address associated with the private key;
      providing the self-custody blockchain address to the mobile application running on the mobile device over the near-field communication channel;
      receiving a request to activate the self-custodied wallet from the mobile application running on the mobile device over the near-field communication channel, wherein the request to activate the self-custodied wallet comprises an activation certificate generated by a custody wallet provider associated with the blockchain address for the crypto card wallet account;
      activating the wallet by setting the private key to an active state; and
      computing and generating a signed transaction request using the stored security keys.

2. The self-custody wallet combination payment card of claim 1, further comprising a primary account number (PAN) stored at the memory, wherein the PAN is associated with the crypto card wallet account.

3. The self-custody wallet combination payment card of claim 2, wherein the payment application, when executed by the processor, performs: communicating a payment request to a payment terminal over the near-field communication channel, wherein the payment request comprises the PAN.

4. The self-custody wallet combination payment card of claim 1, wherein the crypto application performs the computing and generating of the signed transaction request in response to receiving a top-up request for a custodied wallet associated with the blockchain address for the crypto card wallet account from a mobile application over the near-field communication channel.

5. The self-custody wallet combination payment card of claim 4, wherein the crypto application performs the computing and generating of the signed transaction request using the security keys for the self-custodied wallet, wherein the signed transaction request indicates the blockchain address for the crypto card wallet account as a receiving address.

6. The self-custody wallet combination payment card of claim 5, wherein the crypto application further performs:
   receiving the top-up request for the custodied wallet associated with the blockchain address for the crypto card wallet account from the mobile application over the near-field communication channel, wherein the top-up request comprises authentication information;
   validating the authentication information;
   formatting a transaction request;
   signing the transaction request using the security keys to generate the signed transaction request; and
   providing the signed transaction request to the mobile application over the near-field communication channel.

7. The self-custody wallet combination payment card of claim 1, wherein the crypto application performs the computing and generating of the signed transaction request in response to receiving a self-custodied wallet transaction request from a mobile application over the near-field communication channel.

8. The self-custody wallet combination payment card of claim 7, wherein the crypto application performs:
   receiving the self-custodied wallet transaction request from the mobile application over the near-field communication channel, wherein the self-custodied wallet transaction request comprises authentication information and a receiving address;
   validating the authentication information;
   formatting a transaction request;
   signing the transaction request using the security keys to generate the signed transaction request; and
   providing the signed transaction request to the mobile application over the near-field communication channel.

9. A method of operating a self-custody wallet combination payment card, comprising a memory storing a payment application, a crypto application, a blockchain address for a crypto card wallet account, and security keys for a self-custodied wallet, a processor; and a near field communications interface for establishing a near-field communication channel, the method comprising:
   receiving, via the near-field communication channel and from a mobile application running on a mobile device, a request to create the self-custodied wallet, wherein the request to create the self-custodied wallet comprises authentication information;

validating the authentication information;

creating a private key in an inactive state;

storing the private key in the memory as part of the security keys for the self-custodied wallet;

generating a self-custody blockchain address associated with the private key;

providing the self-custody blockchain address to the mobile application running on the mobile device over the near-field communication channel;

receiving a request to activate the self-custodied wallet from the mobile application running on the mobile device over the near-field communication channel, wherein the request to activate the self-custodied wallet comprises an activation certificate generated by a custody wallet provider associated with the blockchain address for the crypto card wallet account;

activating the wallet by setting the private key to an active state; and computing and generating a signed transaction request using the stored security keys.

10. The method of claim 9, wherein the self-custody wallet combination payment card further comprises a primary account number (PAN) stored at the memory, wherein the PAN is associated with the crypto card wallet account, the method further comprising:

communicating, by the payment application, a payment request to a payment terminal over the near-field communication channel, wherein the payment request comprises the PAN.

11. The method of claim 9, further comprising:

receiving a top-up request for a custodied wallet associated with the blockchain address for the crypto card wallet account from a mobile application over the near-field communication channel, wherein the computing and generating the signed transaction request are in response to receiving the top-up request.

12. The method of claim 11, wherein the signed transaction request indicates the blockchain address for the crypto card wallet account as a receiving address.

13. The method of claim 11, wherein the top-up request comprises authentication information, wherein in response to the top-up request, the method comprises:

validating the authentication information;

formatting a transaction request;

signing the transaction request using the private key to generate the signed transaction request; and providing the signed transaction request to the mobile application over the near-field communication channel.

14. The method of claim 9, wherein the computing and generating the signed transaction request are in response to receiving a self-custodied wallet transaction request from a mobile application over the near-field communication channel.

15. The method of claim 14, wherein the self-custodied wallet transaction request comprises authentication information and a receiving address, wherein in response to the self-custodied wallet transaction request, the method comprises:

validating the authentication information;

formatting a transaction request;

signing the transaction request using the private key to generate the signed transaction request; and providing the signed transaction request to the mobile application over the near-field communication channel.

* * * * *